United States Patent
Steinmueller et al.

(10) Patent No.: US 6,682,598 B1
(45) Date of Patent: Jan. 27, 2004

(54) APPARATUS FOR CASTING AND DRYING CERAMIC TAPE

(75) Inventors: Paul H. Steinmueller, San Diego, CA (US); Ernest J. Joly, San Diego, CA (US)

(73) Assignee: Electronic Circuit Systems, San Diego, CA (US)

( * ) Notice: Subject to any disclaimer, the term of this patent is extended or adjusted under 35 U.S.C. 154(b) by 121 days.

(21) Appl. No.: 09/967,827

(22) Filed: Oct. 1, 2001

(51) Int. Cl.[7] ............................................... B05C 11/00
(52) U.S. Cl. ............................. 118/58; 118/61; 118/64; 427/378; 425/224; 425/74; 264/650; 264/212
(58) Field of Search .................. 425/223, 224, 425/74, 75; 118/58, 59, 61, 64, 101, 108; 427/335, 378, 379; 264/650, 165, 212, 216

(56) References Cited

U.S. PATENT DOCUMENTS

| | | | |
|---|---|---|---|
| 2,582,993 A | 1/1952 | Howatt | 25/156 |
| 2,966,719 A | 1/1961 | Park, Jr. | 25/156 |
| 3,192,086 A | 6/1965 | Gyurk | 156/89 |
| 3,991,149 A | 11/1976 | Hurwitt | 264/63 |
| 4,007,304 A | 2/1977 | Dunn, Jr. et al. | 427/314 |
| 4,292,349 A | 9/1981 | Ishiwata et al. | 427/335 |
| 4,510,175 A | 4/1985 | Burn | 427/79 |
| 4,764,402 A | 8/1988 | Pagendarm et al. | 427/355 |
| 5,085,167 A | 2/1992 | Hebels | 118/65 |
| 5,149,401 A | * 9/1992 | Langevin et al. | 162/207 |
| 5,168,639 A | 12/1992 | Hebels | 34/13 |
| 5,183,600 A | * 2/1993 | Scher et al. | 264/491 |
| 5,567,237 A | * 10/1996 | Kapp-Schwoerer et al. | 118/58 |
| 5,759,331 A | 6/1998 | Wallace | 156/248 |
| 6,375,451 B1 | * 4/2002 | Robinson et al. | 425/223 |

OTHER PUBLICATIONS

Richard E. Mistler and Eric R. Twiname. *Tape Casting: Theory and Practice.* 2000 pp. 103–107, 112–119, 154, 257–260.

* cited by examiner

*Primary Examiner*—Richard Crispino
*Assistant Examiner*—Michelle Acevedo Lazor
(74) *Attorney, Agent, or Firm*—Mary Jo Redman

(57) ABSTRACT

A drying apparatus 10 for casting machine 80, including tunnel 20 divided into first chamber 41 and second chamber 46 by barrier 35. Each chamber 41,46 includes gas inlet 50 connected to gas source 100 for introducing inert carrier gas into chamber 41,46 and gas outlet 60 connected to condenser 71 for removing carrier gas with dissolved solvent from chamber 41,46. Porous diffuser 55 and slotted cover 63 cooperate to maintain smooth plug flow of carrier gas in chamber 41,46. Carrier gas flow is parallel to movement of support strip 91 in first chamber 41 and counter to movement of strip 91 in second chamber 46. Slurry 102 is converted to gel in first chamber 41. Gel is dried to green tape in second chamber 46. Gas pump 76 and flowmeter 77 determine flow rate of carrier gas in chamber 41,46. Partial pressure of solvent vapor is near saturation in first chamber 41; cover heat means 37 prevents condensation of solvent vapor inside tunnel 20. Condenser 71 removes solvent vapor from carrier gas for reuse.

12 Claims, 1 Drawing Sheet

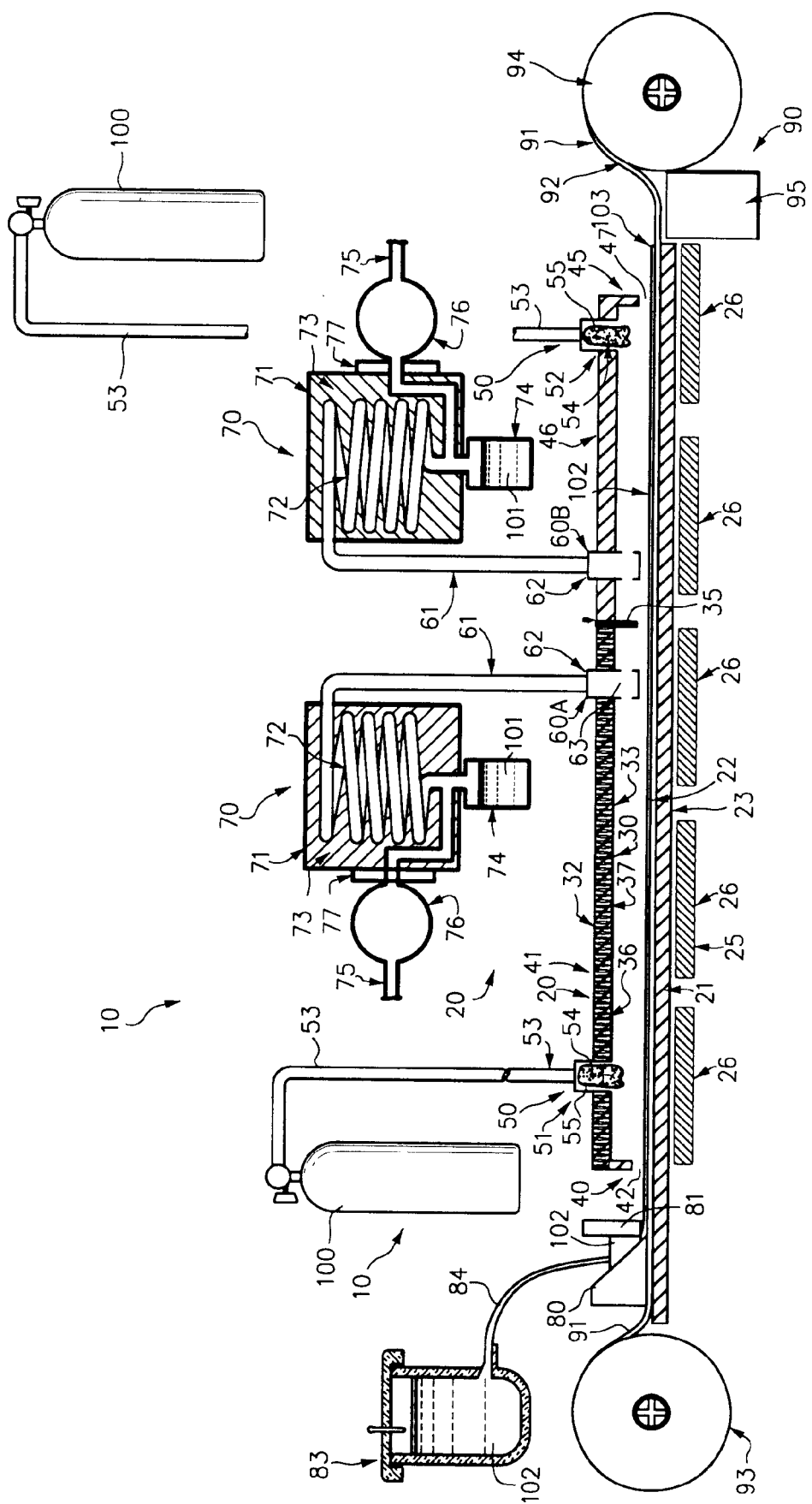

APPARATUS FOR CASTING AND DRYING CERAMIC TAPE

FIELD OF THE INVENTION

This invention relates generally to apparatus and method for drying a coating containing a volatile liquid that has been applied to a support strip that is moved through the apparatus, and more specifically to a drying tunnel for a casting machine for casting ceramic slurry that forms self-supporting tape when dry.

BACKGROUND OF THE INVENTION

The most familiar example of a coating that is applied as a liquid and dried to a solid film is paint. A housepaint is typically formulated from mineral powders that are dispersed in a liquid, called a vehicle, that has a binder such as linseed oil dissolved in a solvent such as turpentine. When the paint is applied to a surface, the solvent evaporates into the atmosphere and leaves behind the mineral powders, or pigments, that are connected into a tough film by the binder, which also helps adhere the film to the substrate surface.

The electronics industry has long used a similar principle to form thin sheets of ceramic materials to use as the insulating portion of structures and devices used in electronic circuits.

U.S. Pat. No. 2,966,719, of J. L. Park, Jr., is the earliest disclosure of forming ceramic "tape" on a continuous support strip. U.S. Pat. No. 6,097,135, of Cappabianca, issued in 2001, discusses the art of "tape casting" from a modern perspective.

The constituents of the ceramic formulation are mixed into a "slurry", or "slip", by dispersing them into a vehicle that contains solvent, a binder, which is typically a polymer such as polyvinyl butyral, and handling aids such as wetting agent and "plasticizer". The solvent should be one that dissolves all of the organic components, is not reactive with any of the components, either organic or inorganic, and has a high vapor pressure so that it dries quickly. In practice, the solvent is frequently a mixture of solvents of slightly differing properties.

The slurry is deposited on a support strip by a "doctor blade", by curtain coating, or other applicator means. The support strip, with applied coating, is moved along a path that is long enough for the tape to dry by evaporation of the solvent before the tape is stripped from the support strip or is taken up on a storage reel still on the support strip. This dry product, called green tape, can be printed with conductive paste, punched or cut into desired shapes, and stacked and laminated into thick forms. The resulting structure is fired. During firing, the remaining binder and other organics are burned away and the inorganic components undergo melting, sintering, or chemical reaction to form a monolithic ceramic or glassy object.

Because the fired ceramic generally is required to be dense and pore-free for the sake of its electrical properties, a minimal amount of binder in the slurry is desirable. The more binder that must be burned to gas and released from the ceramic during firing, the more porosity and defects the fired article will have. Unfortunately, slurry with a low binder content is more likely to crack as it is dried to green tape.

In 1961, the greatest difficulty with Park's method was drying the tape quickly enough to manufacture the tape in a continuous strip without needing to provide a prohibitively long path for the tape to travel as the solvent dried. Park taught that drying could be accelerated by heating the slurry to a temperature less than the boiling point of the solvent used. "The factors of temperature and rate of drying are controlled by passing heated air in a countercurrent direction to the movement of the coated supporting tape through a drying chamber". In 2001, Cappabianca teaches, "A major limiting factor of tape casting is the time required to dry the tape. The surface texture of the tape directly relates to the drying rates. This can cause the drying chamber to be as long as 35 meters depending on the drying rate".

Cappabianca further states, "The evaporation rate is typically regulated by controlling the heating or air flow over the tape. The surface texture of a tape cast material directly relates to the drying rate. If the top surface dries too quickly, a skin may form over the tape resulting in defects. Some of the defects that arise by improper drying include bubbles in the tape, tape distortion, and tape cracking . . . The continuous caster's air flow normally starts at the exit of the drying chamber and flows in the opposite direction of the moving tape".

Mistler and Twiname, in *Tape Casting: Theory and Practice*, say on page 104, "Casting machines are very simple in design, since they are really only elongated (in some cases) forced-air drying ovens". On page 113, "Another factor in airflow requirements during the casting of any flammable solvent(s) in the presence of heat is safety. There are published regulations as to the volume of airflow that must be maintained to remain below the lower explosion limit (LEL)". Page 115, "All fans used on or near the tape casting machine should be explosion-proof if volatile, flammable solvents are being used in the process".

These references show that blowing heated air over the drying slurry in a countercurrent direction has two serious problems. Firstly, there is a grave safety and environmental hazard produced by mixing volatile (fast-drying) solvents with air. Tape casting operations are notorious for explosion and fire hazard, and workers are typically exposed to vapors of toxic chemicals. The means used to heat the air can add to the explosion danger. Solvent fumes that were once simply vented to the roof are now regulated and must be removed from the air by distillation, filtration, or ignition.

Air is typically blown over the slurry at a speed of 1 to 10 feet per second in order to maintain the solvent vapor at a concentration below the lower explosion limit. As a rule of thumb, the ratio of air mass to solvent vapor mass should be about one hundred. Keeping the concentration (partial pressure) of solvent vapor this low also increases the evaporation rate of the solvent from the surface of the slurry. This leads to rapid formation of the "skin" of binder on the upper surface of the slurry, as mentioned above by Cappabianca. The skin inhibits further evaporation and may cause cracks, wrinkles, wedging, and other defects in the tape.

Secondly, the electronics industry increasingly requires tape that is thicker, more uniform in thickness, and has fewer and smaller defects. At the same time, new materials are being introduced that are more difficult to cast thickly, such as ferrite for inductors. The usual method of using ferrite by the green tape process is to cast it into tapes less than 0.005" in thickness, which are stacked together to form a layer of the required thickness. Attempting to cast the tape to the desired thickness with industry standard equipment can result in disastrous cracking and other defects.

To help decrease the defects induced by high airflow, many casting machines need to have baffles, louvers, and dampers to create local pockets of air with relatively higher concentration of solvent vapor when casting tapes thicker than about 0.010" thickness. These devices are adjusted by trial and error and their interactions are not well understood.

Onur et al. (U.S. Pat. No. 5,212,877) teach that use of heated nitrogen instead of air to dry a coating such as magnetic tape avoids explosion and fire hazards, thus allowing the partial pressure of solvent vapor to be greater than the explosion limit in air, thereby moderating the evaporation of solvent and suppressing skin formation. Onur et al. teach discharging the nitrogen from nozzles above and below the support strip; the jets of gas float the strip in the stream to give quick, uniform drying. This method is not suitable for coatings as thick as green ceramic tape. It has been found that these thicker coatings tend to crack when heated from above. Also, rapid jets of gas impinging on the wet slurry would cause irregularity of the thickness because of the rheology of ceramic slurry.

Attempts have been made to use halogenated solvents such as methylene chloride or 1,1,1-trichloroethane as the solvents in ceramic slurries to avoid flammability problems, but halogenated solvents are expensive, toxic, highly regulated, and are incompatible with the binders and other vehicle components generally used.

Attempts have been made to develop vehicles using water as the main solvent. Water is wonderful for avoiding explosion, health, and environmental problems, but has limited use in ceramic slurries. Water has a low evaporation rate, the binders it is compatible with tend to be difficult to laminate and fire, and it reacts chemically with many of the oxides and other components used to make the ceramic.

Hebels (U.S. Pat. No. 5,1 68,639) discloses a method and apparatus for applying a coating to a web, such as glue onto adhesive tape, that facilitates recovery of the evaporated solvent vapor. Hebels desires the partial pressure of solvent vapor to be high to increase efficiency of the solvent recovery, and avoids fire hazard by drying the coating in a chamber previously flushed with nitrogen gas. Hebels has noted that a problem associated with high partial pressure of solvent vapor is condensation of the solvent on the inside of the chamber, therefore the apparatus disclosed includes a chilled roller inside the chamber, which preferentially attracts condensation. A stripping device diverts the condensed solvent into a trough so that the liquid does not drip onto the wet glue. A flow sensor monitors escape of solvent from the system and calls for increased chilling of the roller when solvent vapor escape is excessive. This apparatus and method does decrease the amount of volatile solvent released to the atmosphere, but does not have sufficiently sensitive control means for casting thick, high quality ceramic tape. Movement of the solvent vapor is weakly driven by entropy, and the only control means, the temperature of the roller, is too crude, slow, and indirect a means for achieving sufficient throughput of ceramic tape.

Mistier and Twiname note on page 154, "some practitioners opt to slow the surface drying rate of their cast by placing solvent-soaked rags or paper towels or containers of solvent in the drying chamber to saturate the local atmosphere. While effective, this practice is not advisable due to fire and safety concerns; it would send your safety engineer and local OSHA representative into fits". However tantalizing this tip is, the authors teach no way of accomplishing the same effect safely. In fact, they go on to say, "Saturation or proximity to saturation is generally not an addressable concern with tape casting equipment due to the high levels of airflow. Airflow must be adjusted, apart from drying concerns, to a level specified by fire and safety codes". The section closes with, "Due to the minimum airflow requirements imposed by safety and fire regulations, the surface evaporation can only be increased to a certain extent. Due to this limitation, the other variables affecting surface evaporation require attention". Subsequently, Mistler and Twiname discuss customizing the formulation of the organic vehicle and the inorganic components of the slurry to ameliorate problems such as cracking and curling, especially increasing the amount of binder. As noted above, though, increasing the binder can lead to other problems.

The tradeoffs between drying rate and coating quality are problems in other applications, such as coating photographic film with emulsion or metallizing plastic film by depositing a metallo-organic solution that is subsequently converted to metal.

There is a long felt need for an apparatus and method for depositing and drying coatings containing volatile solvents that produce substantially defect-free coatings with uniform thickness, while minimizing health and safety risks. There is further a need for an apparatus and method that can produce large quantities of uniform product, including ferrite of a thickness greater than 0.005 inch.

There is a need for an apparatus and method that has sensitive control means for optimizing the process, yet can be operated by a typical technician. There is a need for such apparatus and method to include means for automated feedback and improvement of the process.

It would be desirable for such an apparatus to be adjustable to work well with a variety of formulations and thicknesses of slurry. It is desirable that the apparatus be adjustable to accommodate reasonable batch-to-batch variation and variations deliberately introduced for process improvement studies. Because casting machines are expensive and usually require elaborate equipment verification when installed, it is desirable to improve the performance of existing equipment by retrofitting only a new drying tunnel.

In the forty years separating Park, Jr. and Cappabianca, enormous changes have been seen in the materials and specifications for green ceramic tape, yet the apparatus and method for producing the tape have changed very little.

SUMMARY OF THE INVENTION

The present invention is an apparatus and method for drying ceramic green tape made from a variety of materials, in a wider range of thicknesses than can be achieved with prior apparatus and methods. The apparatus and method, with slight modification, is also useful for metallizing plastic film by coating with a metallo-organic solution, as well as other applications.

The apparatus of the present invention is a drying tunnel for a tape casting machine that includes a casting head and a movement system for driving a continuous support strip relative to the casting head. The drying tunnel comprises two chambers, separated from each other by a barrier. Within the first chamber, the slurry loses 80 to 90 per cent of the solvent by evaporation and changes from a fluid to a gelled state. In the second chamber, nearly all of the remaining solvent is evaporated and the coating that emerges from the tunnel is dry to the touch and has no odor of solvent.

Air is excluded from both chambers and an inert carrier gas, preferably dry nitrogen at ambient temperature and with a velocity typically 1 to 5 inches per second, helps control the rate of evaporation of the solvent from the slurry. The mass flow rate of nitrogen used is typically equal to the mass flow rate of solvent evaporated in the tunnel, so cost of nitrogen is not prohibitive. The carrier gas is introduced by a gas inlet in each chamber. A first gas inlet is located near the entrance to the tunnel and a second gas inlet is located near the exit from the tunnel.

A coating containing a volatile liquid, such as ceramic slurry containing an organic solvent, is applied to the support strip by an applicator such as the casting head of a casting machine. The strip and its coating of slurry then pass into the drying tunnel.

The floor of the tunnel is heated. Heat is conducted through the strip and raises the temperature of the slurry, with the highest temperature being always at the bottom of the slurry. Solvent diffuses upward through the slurry and evaporates from the upper surface. The vapor is entrained in the carrier gas and moved toward a gas outlet. Plug flow of carrier gas is maintained in the tunnel so that smooth and stable gradients of temperature and partial pressure of solvent vapor can be achieved.

In a preferred embodiment, the two chambers are separated by a barrier having a gap only sufficient to allow passage of the support strip and applied slurry so that exchange of gases between chambers is minimized. Each chamber has a gas outlet and associated solvent vapor removal means (described below).

The atmosphere inside the first chamber has a high partial pressure of solvent vapor, and is nearly saturated. To prevent solvent from condensing on the upper part of the tunnel and damaging the slurry coating by dripping onto it, or obscuring the view through the cover of the tunnel, the tunnel cover is heated slightly.

The high partial pressure of solvent vapor in the first chamber moderates the evaporation of solvent from the surface of the applied slurry, so that the binder does not form a skin before the slurry has gelled.

To allow drying to progress, solvent vapor must be removed from the tunnel. The carrier gas guides the vapor toward the gas outlet to a solvent vapor removal means, such as a condenser.

A first gas outlet is located in the first chamber near the barrier. A second gas outlet is located in the second chamber, near the other side of the barrier. Carrier gas is thus moving from both ends of the tunnel toward the barrier. As a result, carrier gas flow is parallel to the direction of travel of the support strip in the first chamber and counter-directional to the travel in the second chamber.

The apparatus of the present invention has a great many variables that can be adjusted to produce the best results. This sensitivity of control allows many types of ceramic and glassy materials to be cast to dry thicknesses greater than 0.005" thick with uniformity of thickness on a single machine with a relatively short tunnel length. These variables interact predictably; with suitable sensors in place and an appropriate algorithm, sophisticated automated control is practical. The design of the system allows existing casting machines to be retrofitted to use the method of the present invention.

Because a solvent removal system, such as a condenser, is an integral part of the apparatus, solvent is not released to the ambient atmosphere and a burn-off torch is not needed. The solvent recovered from the condenser is typically reused. The carrier gas may be recirculated to the drying tunnel after solvent vapor is removed.

The apparatus of the present invention uses a fraction of the electricity that the drying tunnels of casting machines now in use in the industry do because enormous volumes of air are not heated. No explosion-proof air fans and heaters are required.

Obviously, many modifications and variations of the present invention are possible in light of the above teachings. It is therefore to be understood that within the scope of the appended claims the invention may be practiced otherwise than as specifically described. The invention will now be described in more particular detail with respect to the accompanying drawings in which like reference numerals refer to like parts throughout.

BRIEF DESCRIPTION OF THE DRAWING

The lone FIGURE is a diagrammatic, cut-away side view of the drying apparatus 10 of the present invention, shown attached to a casting machine 80.

DETAILED DESCRIPTION OF THE DRAWING

The lone FIGURE is a diagrammatic, cut-away side view of the drying apparatus 10 of the present invention, shown attached to a typical casting machine 80. Drying apparatus 10 comprises a tunnel 20 having an entrance end 40 and an exit end 45, a barrier 35 dividing tunnel 20 into a first chamber 41 and a second chamber 46. Each chamber 41,46 includes a gas inlet 50 for introducing carrier gas into chamber 41,46 and connected to a gas source 100; and a gas outlet 60 connected to a solvent vapor removal means 70, such as condenser 71, for controllably removing solvent vapor from chamber 41,46. In the drawing, parts identified by a numeral and the letter A are associated with first chamber 41. Parts identified by a numeral and the letter B are associated with second chamber 46.

Casting machine 80 includes a casting head 81 for applying slurry 102 to support strip 91, and a support strip movement system 90 for moving support strip 91 relative to casting head 80. Movement system 90 typically includes a supply reel 93 with a supply of support strip 91, such as Mylar film, a takeup reel 94 that takes up support strip 91 and its applied coating of dried slurry 102, also known as green tape 103, and a takeup drive motor 95 for moving support strip through casting machine 10 from supply reel 93 past casting head 81, through drying tunnel 20, toward takeup reel 94. Support strip 91 could alternatively be sheets of glass, a strip of metal such as stainless steel, or sheets or strips of other plastic such as. polyvinylidene chloride. Mylar film 92 is often used because its strength and flexibility allow it to be used as an "endless" web. Green tape 103 could also be stripped from support strip 91 at exit 45 and stored by some other means.

Casting head 81, located near supply reel 93, applies a controlled deposit of slurry 102 to support strip 91. The previously prepared slurry 102 is contained in a reservoir 83 with feed means 84 for delivering slurry 102 to casting head 81. Casting head 81 includes a doctor blade 82, spaced above support strip 91 and moved vertically by height adjustors (not shown), such as micrometers. Slurry 102 flows through the opening between doctor blade 82 and support strip 91. The thickness of the wet coating thus applied depends on the viscosity of slurry 102, the height of doctor blade 81 above support strip 91, and the rate of horizontal travel of support strip 91 relative to casting head 80.

Support strip 91 and its applied coating of slurry 102 are pulled by takeup drive motor 95 into first chamber 41 through entrance opening 42. Entrance opening 42 is preferably only slightly wider than support strip 91 and just high enough to accommodate support strip 91 and any expected thickness of slurry 102. Opening 42 may be adjustable so that it is never larger than necessary for a given casting of slurry 102. It is desirable to have opening 42 no larger than necessary so that ambient air does not enter chamber.41.

Except for entrance opening 42 and exit opening 47, tunnel 20 is closed to ambient atmosphere. Inert carrier gas, such as dry nitrogen from gas source 1.00, is introduced through gas inlet(s) 50, such as entrance gas inlet 51 and exit gas inlet 52, connected to source 100 by gas source pipe(s) 53. By "inert" is meant a gas that does not support combustion nor react with any components of slurry 102. Nitrogen is readily available and is often already used for other operations in a factory that uses or produces green tape. Other potential carrier gases are carbon dioxide or argon. In some cases, it may be necessary to use air as a carrier gas, but many of the safety and energy saving advantages would be lost.

Unlike ambient air, compressed or cryogenic nitrogen contains almost no water vapor, so its properties are consistent from day to day and no energy needs to be expended on removal of water. Water vapor can affect the vehicle of the slurry, changing its flow properties; can adsorb onto the support strip, affecting the slurry's flow and strippability; or can react with ceramic components of the slurry, changing their firing behavior. When ambient air is heated and blown through the drying tunnels of prior art equipment, water vapor either is removed or results in an uncontrolled variable in the process.

Gas inlet 50 includes gas diffusing means 54, such as porous plug 55, for producing a smooth flow of carrier gas 100 into tunnel 20. Front gas inlet 51 is located in first chamber 41 adjacent entrance end 40 or spaced slightly away from entrance end 40. Typically, about one fifth of the carrier gas received through front gas inlet 51 moves toward entrance opening 42 to prevent air from entering first chamber 41. The distribution of carrier gas is controlled by gas pump 76.

Tunnel 20 also includes at least one gas outlet 60 for taking carrier gas and its entrained solvent vapor out of tunnel 20. Gas outlet 60 is connected to solvent condenser 71 by gas outlet pipe 61. It has been found experimentally that, in the case of a single gas outlet 60, gas outlet 60 is best located at the point of tunnel 20 where slurry 102 changes from a fluid, albeit a pasty fluid, to a "gel." When the molecules of binder are completely surrounded by solvent molecules, the binder molecules stretch out and are flexible. Slurry 102 is in a fluid state when the binder is solvated. When not completely solvated, the binder molecules fold up more, tangle together, and cannot flow freely in the vehicle. This is the gel stage of the slurry.

In a methyl ethyl ketone solvated system, for example, gelling typically occurs when slurry 102 has lost about 80% of its initial solvent by evaporation and the molecules of the binder resin interact with each other more than with solvent molecules. During this stage, skin formation can be allowed because movement of fluid slurry does not occur under the skin, although gelled slurry 102 is still too soft to be self-supporting.

Barrier 35 divides tunnel 20 into chambers 41, 46. First chamber 41 is the portion of tunnel 20 between entrance opening 42 and barrier 35; second chamber 46 is the portion between barrier 35 and exit opening 47. The slurry 102 coating the portion of support strip 91 in first chamber 41 must not form a skin, as discussed in the Background section. To prevent this, the partial pressure of solvent vapor in first chamber 41 is maintained high enough that the evaporation rate of solvent from the surface of applied slurry 102 is no greater than the diffusion of solvent from within applied slurry 102 to its surface. In second chamber 46, slurry 102 has gelled and evaporation may be as rapid as is practical.

In first chamber 41, most of the carrier gas flows toward gas outlet 60A at a rate controlled by gas pump 76. The rate at which carrier gas enters first chamber 41 via gas inlet 51 is controlled by any means common to the art (not illustrated). The gas mixture must exhibit plug flow through first chamber 41 and preferably in second chamber 46. Herein the term "plug flow" is used to mean fluid flow with a flat velocity profile (in a plane perpendicular to the length of tunnel 20) and no mixing parallel to the length of tunnel 20. Mixing of solvent vapor through a lateral cross-section of tunnel 20 is desirable for rapid drying. The carrier gas and entrained solvent vapor typically moves through chamber 41 at a velocity greater than the velocity of support strip 91.

To hasten both diffusion and evaporation of solvent, applied slurry 102 is heated from below. Tunnel 20 includes floor 21 at the bottom of tunnel 20, having an inward-facing inside, face 22 and a outward-facing bottom face 23. Strip 91 is against inside face 22. Floor 21 of tunnel 20 is heated by bottom heat means 25, such as resistance heaters 26 attached to or embedded in bottom face 23. Heat is conducted through floor 21 and support strip 91, causing a vertical temperature gradient through applied slurry 102, with highest temperature adjacent strip 91. Bottom heating increases diffusion preferentially over evaporation; top heating, as with heated counterflow air, increases evaporation preferentially and promotes skin formation.

A horizontal temperature gradient, with temperature generally increasing with greater distance from entrance end 40, is applied to slurry 102 by resistance heaters 26. If the temperature were uniform throughout, evaporation would be rapid at first then slowing as the remaining solvent in slurry 102 interacted more strongly with the other, low volatility components of the vehicle and was hindered from diffusing to the surface of slurry 102. At equilibrium, molecules pass back and forth from liquid to gaseous state at equal rates, so no net change is observed. The relative amounts of liquid and vapor that coexist at equilibrium (in a given volume) depend on the temperature. If the vapor is removed from the system, net evaporation continues until no liquid remains. The slope of the gradient and the maximum temperature are adjusted to be appropriate for the vehicle used and the thickness of green tape 103 being cast. This adjustment of resistance heaters 26 and adjustment of the rate of travel of support strip 91 are two of the means by which casting machine 10, fitted with tunnel 20, can accommodate different vehicle systems with a fixed length of tunnel 20 and location of gas outlet 60.

A third dimension of control is the horizontal gradient of partial pressure of solvent vapor in chambers 41,46. The concentration of solvent vapor at a given point along tunnel 20 is indirectly related to the temperature of slurry 102 at that point, but also depends on other factors. In addition to factors inherent in slurry 102, controllable factors are the mass flow of carrier gas through first chamber 41 and the rate of removal of solvent vapor from the carrier gas by condenser 71. In the present invention, the mass ratio of solvent evaporated from applied slurry 102 to carrier gas is typically in the range of 0.5 to 2.0. This efficiency is about one hundred times that of other casting machines known to be in use in the electronic ceramics industry.

The rate of solvent vapor removal depends largely on the mass flow rate of carrier gas out gas outlet 60 to condenser 71. This gas flow is driven by gas pump 76 and controlled by flowmeter 77. As may be seen in the drawing, pump 76 and flowmeter 77 are located "downstream" of condenser 71. Thus, flowmeter 77 is measuring carrier gas only.

Condenser 71 typically includes a thermally conductive coil surrounded by a cooling means 73, such as an electric chiller. As carrier gas laden with solvent vapor moves through coil 72, it is cooled sufficiently that the solvent vapor condenses out of the carrier gas. The condensed solvent 101 is collected in solvent collector 74 and reused. The carrier gas, now free of solvent vapor, may be discharged to the ambient atmosphere or recirculated into tunnel 20 via dry gas outlet pipe 75.

When a solvent condensers is used with casting machines having drying apparatus of the heated counterflow air type, extra care must be taken to remove all water vapor from the air to avoid problems of ice buildup in coil 73 and contamination of collected solvent 101. Use of dry nitrogen as a carrier gas allows very simple solvent collection and reuse. More importantly, the one-to-one ratio of solvent to carrier gas of the present invention means that condensation is efficient and economical. Casting machines typically in use in industry have a one-in-one hundred ratio of solvent to air. As the air is also heated, much energy would be used to cool the air sufficiently to recover the solvent. A burn-off torch is usually considered a more practical pollution control means.

Cooling means 73 may also be dry ice, a combination of water ice and salt, or cryogenic nitrogen. Cooling means 73 may be adiabatic cooling, in which case there would be no coil 72.

Alternative solvent vapor removal means 70 envisioned, but not illustrated, are chemical reaction, filtration, or adsorption.

For some applications, it is desirable to recirculate carrier gas into tunnel 20 with a small partial pressure of solvent vapor remaining in it. This may be accomplished by increasing the temperature of cooling means 73, or by other mechanical means well known to the art.

To maintain plug flow in chamber 41,46, gas outlet 60 A,B includes uniform flow means 62, such as slotted cover 63. Slotted cover 63 pulls in carrier gas through an array of very narrow slots, typically 0.01 inch wide. Slotted cover 63 cooperates with gas diffusing means 54 to move the carrier gas smoothly through tunnel 20. In first chamber 41 the gas moves parallel to the movement of support strip 91 and its applied slurry 102; in second chamber 46 the gas movement is counter to the movement of support strip 91. Barrier 35 separates first chamber 41 from second chamber 46 to prevent mixing of gases between chambers. Barrier 35 has an opening below it sufficient to allow support strip 91 and applied slurry 102 to pass beneath without touching barrier 35.

A second gas outlet 60B is located in second chamber 46, connected to a second gas pump 76. The rate of carrier gas flow in second chamber 46 is independent of the flow in first chamber 41.

In an alternative embodiment, not illustrated, a single gas outlet 60 is employed. Gas outlet 60 is adapted so as to form barrier 35 and includes two sets of orifices for drawing carrier gas separately from first chamber 41 and second chamber 46.

In first chamber 41, the partial pressure of solvent vapor is high. The dewpoint for a given partial pressure of vapor is the temperature at which the vapor condenses to a liquid. A system with higher partial pressure of vapor has a higher dewpoint than a system with lower partial pressure of vapor. The dewpoints of the various regimes of atmosphere in first chamber 41 are typically close to ambient temperature. Thus, solvent vapor could condense inside tunnel 20, particularly on inner surface 33 of cover 30. As floor 21 is typically heated by resistance heaters 26, floor 21 is normally warmer than the dewpoint of solvent vapor.

Condensation of solvent on inner surface 33 is undesirable for two reasons. First, liquid solvent may drip onto the support strip 91 and applied slurry 102. Applied slurry 102 will be damaged by the drops, and the presence of unpredictable amounts of solvent will disrupt the stability of the drying process. Second, cover 30 is preferably made of a transparent material, such as glass or Plexiglas, so that the drying of applied slurry 102 may be observed. Even a fog of small droplets on inner surface 33, not large enough to detach and fall, will render cover 30 non-transparent. For these reasons, cover 30 includes drip prevention means 36.

In the preferred embodiment, drip prevention means 36 comprises cover heating means 37. Cover heating means 37 may comprise resistance heating wires embedded within cover 30 or radiation, such as infrared or microwave waves, directed onto upper surface 32 of cover 30. Where cover heating means 37 is radiation, cover 30 must be a material that increases temperature in response to the radiation used. Where cover heating means 37 is electrical heat applied to upper surface 32, cover 30 must be a material that conducts heat sufficiently.

Cover heating means 37 must not heat the atmosphere inside chambers 41,46 appreciably, to avoid disrupting the gradient of partial pressure of solvent vapor. In most cases, increasing the temperature of inner surface 33 by only one degree Fahrenheit above the temperature of the gas inside tunnel 20 will be sufficient to prevent condensation on inner surface 33.

An alternative drip prevention means 36 (not shown) comprises a mechanical design of cover 30. For example, cover 30 may be non-parallel to floor 21, even to the extent of being at a 45 degree angle to floor 21. On a slanting surface, droplets roll downwards while at a size smaller than that required for them to detach and drop. A trough, not shown, along the lower side of cover 30 collects the liquid and directs it to solvent collector 74. In this embodiment, cover 30 is preferably a material that is not well wetted by solvent 101, so that a vision obscuring fog cannot cling to inner surface 33. If cover 30 can be wetted by solvent 101, an anti-wetting coating, that is, one on which solvent 101 has a contact angle of 90 degrees or more, is applied to inner surface 33.

In second chamber 46, applied slurry 102 is in a gelled state and is no longer as susceptible to wedging and cracking. The temperature gradient from bottom heaters 26 may be ramped up to render green tape 103 substantially dry when it exits tunnel 20. Not all of solvent 101 will be evaporated, as some will remain bound with the binder and plasticizer of the vehicle, but typically 98% or more of solvent 101 will have been driven off. Green tape 103 will be dry to the touch, flexible but not excessively brittle, and free of solvent odor when it passes through exit opening 47 into ambient atmosphere.

Green tape 103 may be stripped from support strip 91 by a stripper device (not illustrated) continuously upon exit from tunnel 20, or tape 103 may be wound on takeup reel 94 still on support strip 91, as illustrated.

Preferably, the thickness of green tape 103 is monitored manually or automatically. If the variation of thickness is not within the specified range, adjustments are made to doctor blade 81 or takeup drive motor 95. As mentioned above, automated feedback and adjustment is possible by means of a suitable algorithm, which can be developed by one skilled in the art and need not be detailed here.

It can be seen from the above description that the present invention is an efficient, energy-saving means for casting green ceramic tape. The many dimensions of sensitive control allow difficult-to-cast materials to be cast up two or three times as thick as other casting machines now in use, with less variation of thickness and fewer defects.

Although a particular embodiment of the invention has been illustrated and described, various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention.

We claim:

1. In combination:
   a casting machine for coating a support strip with a slurry containing a volatile liquid to form green ceramic tape, comprising:
      a casting head for applying the slurry; and
      a movement system for moving the support strip relative to the casting head; and
   a drying apparatus for drying the applied slurry by controlled evaporation of the volatile liquid; comprising:
      a tunnel; including:
         a floor;
         a cover spaced above said floor;
         a barrier dividing said tunnel into a first chamber and a second chamber; each said chamber including:
            a gas outlet disposed adjacent said barrier for controllably removing carrier gas and entrained vapor of the volatile liquid from said chamber; and
            a gas inlet connected to a carrier gas source for introducing carrier gas into said chamber disposed opposite said gas outlet; and
      solvent vapor removal means connected to each said gas outlet for removing the vapor of the volatile liquid from the carrier gas; and wherein: the movement of carrier gas in said first chamber is substantially parallel with the relative movement of the support strip and applied coating; and the movement of carrier gas in said second chamber is counter to the relative movement of the support strip and applied coating.

2. The combination of claim 1, wherein said barrier is located such that transition of the slurry to a gelled state is accomplishied entirely within said first chamber.

3. The combination of claim 1, cover comprising
   an inner surface inside said tunnel; and
   an upper surface outside said tunnel; and drip prevention means comprising:
      cover heating means for heating said cover to a temperature sufficient to prevent condensation of vapor on said inner surface.

4. The combination of claim 1, said solvent vapor removal means including: a condenser.

5. The combination of claim 1, said floor including:
   bottom heating means for heating the support strip for increasing the rates of diffusion and evaporation of the volatile liquid from the coating.

6. The combination of claim 5, said floor being constructed of thermally conductive material and comprising:
   an inward-facing inside face; and
   a downward-facing bottom face; and
   said bottom heating means comprising resistance heating means attached to said bottom face of said floor.

7. The combination of claim 1, wherein the carrier gas in said first chamber has a velocity of one to six inches per second.

8. The combination of claim 7, said gas inlets including gas diffusing means for distributing carrier gas smoothly inside said tunnel.

9. The combination of claim 7, said gas outlets including uniform flow means for removing carrier gas smoothly from said tunnel.

10. The combination of claim 9, said gas inlets including gas diffusing means for distributing carrier gas smoothly inside said tunnel; and wherein:
    said gas diffusing means and said uniform flow means cooperate to cause plug flow of the carrier gas inside each said chamber.

11. The combination of claim 10, wherein the ratio of the mass of volatile liquid evaporated in said first chamber to the mass of carrier gas input to said first chamber, multiplied by a factor consisting of the molecular weight of the carrier gas divided by 28, is in the range of 0.5 to 2.0.

12. The combination of claim 1, wherein said barrier substantially prevents mixing between the atmospheres of said first chamber and said second chamber.

* * * * *